(12) United States Patent
Weidinger et al.

(10) Patent No.: US 8,871,330 B2
(45) Date of Patent: Oct. 28, 2014

(54) FLEXIBLE INSULATION COMPOSITE FOR HIGH AND LOW TEMPERATURES

(75) Inventors: Jürgen Weidinger, Münster (DE); Christoph Zauner, Münster (DE); Mark E. Harakal, Münster (DE); Stephan Möller, Münster (DE)

(73) Assignee: Armacell Enterprise GmbH & Co. KG, Schönefeld OT Waltersdorf (DE)

( * ) Notice: Subject to any disclaimer, the term of this patent is extended or adjusted under 35 U.S.C. 154(b) by 680 days.

(21) Appl. No.: 13/207,827

(22) Filed: Aug. 11, 2011

(65) Prior Publication Data
US 2012/0040161 A1 Feb. 16, 2012

(30) Foreign Application Priority Data
Aug. 16, 2010 (EP) .................................. 10172863

(51) Int. Cl.
| | |
|---|---|
| *B32B 3/00* | (2006.01) |
| *B32B 3/26* | (2006.01) |
| *B32B 3/28* | (2006.01) |
| *B32B 3/30* | (2006.01) |
| *F24J 2/51* | (2006.01) |
| *F16L 59/02* | (2006.01) |

(52) U.S. Cl.
CPC ............... *F16L 59/029* (2013.01); *F24J 2/515* (2013.01); *Y02E 10/40* (2013.01)
USPC .......... 428/172; 428/156; 428/158; 428/36.5; 428/36.91; 428/304.4; 428/314.4; 428/314.8; 428/315.9

(58) Field of Classification Search
USPC .......... 428/36.5, 36.9, 36.91, 35.7, 35.9, 172, 428/156, 158, 167, 304.4, 314.4, 314.8, 428/315.9, 316.6, 318.4; 138/141, 149, 177
See application file for complete search history.

(56) References Cited

U.S. PATENT DOCUMENTS

| | | | |
|---|---|---|---|
| 6,248,433 B1 | 6/2001 | Aanestad | |
| 6,403,180 B1 * | 6/2002 | Barrall | ........................ 428/36.5 |

FOREIGN PATENT DOCUMENTS

| | | |
|---|---|---|
| DE | 2461013 A1 | 6/1976 |
| DE | 247586 A3 | 7/1987 |
| DE | 9117159 U1 | 6/1996 |
| DE | 19926850 A1 | 8/2000 |
| DE | 4143646 C2 | 8/2001 |
| DE | 4143670 B4 | 5/2004 |
| EP | 0505759 A2 | 9/1992 |
| EP | 1180635 A2 | 2/2002 |
| EP | 1239205 A2 | 9/2002 |
| GB | 1475860 | 6/1977 |
| WO | 2008/017147 A1 | 2/2008 |

* cited by examiner

*Primary Examiner* — Catherine A Simone
(74) *Attorney, Agent, or Firm* — Rothwell, Figg, Ernst & Manbeck, P.C.

(57) ABSTRACT

The present invention relates to a thermal and/or sound insulation system with resistance to elevated as well as low temperatures comprising at least one inner layer (A) obtained from temperature invariant and/or temperature resistant material as decoupling layer, at least one layer (B) as intermediate temperature gradient layer comprising temperature invariant and/or temperature resistant material, and at least one outer layer (C) as insulation layer comprising an expanded polymer blend, the process for manufacturing of such a system and the use of such system.

20 Claims, 5 Drawing Sheets

Etc.

Etc.

Figure 5

FLEXIBLE INSULATION COMPOSITE FOR HIGH AND LOW TEMPERATURES

FIELD OF THE INVENTION

The present invention relates to a thermal and/or sound insulation system with resistance to elevated as well as low temperatures, the process for manufacturing of such system and the use of such system.

BACKGROUND OF THE INVENTION

Insulation systems for shielding high and low temperatures or for damping noise created in systems running at named temperatures, respectively, are dominated by mostly inorganic materials (glass or mineral fibre like Isover® or Rockwool®, foamed glass like Foamglas®, silica, silica gels like Aerogel® etc.) or rigid crosslinked expanded resins (PIR/PUR like Puren®, thermosets, such as melamine, like Basotec®, or phenolics). All those systems lack easy mounting and demounting properties, are in discussion due to fibre release, and show limits both when it comes to efficiently insulating bows, flanges etc., and of course can scarcely be offered as pre-insulation, e.g. on corrugated pipe. Furthermore fibrous materials and open-cell, rigid expanded resins have a high gas and water vapour transmission. This can e.g. cause condensation on the pipes which leads to corrosion. Foamed glass is not flexible and therefore the installation is quite elaborate and expensive. Due to this, foamed glass does not withstand vibrations, expansion/contraction cycles etc., limiting its fields of applications. Similar arguments are used against the other a.m. rigid insulations.

One of the major drivers for works in the field of more flexible high temperature insulation solutions definitely is the solar industry, especially since evacuated tube collectors showed up in the market, as their connected piping system may reach temperatures higher than 200° C. The majority of proposals for flexible high temp insulation bases on the use of a non-degradable or at least very temperature inert inner layer, such as in DE 19926850, EP 1239205 or in some applications in use (e.g. Trocellen Solar Sleeves, WIP-FLEX-TWIN® "V" etc.). However, all those solutions again have to rely on inner layers of the well-known inorganic kind and therefore show no significant improvement of the a.m. disadvantages of such materials. For low temperature insulation (below -30° C.) most of the a.m. rigid solutions are equally applied, showing the same disadvantages.

Flexible, means elastomeric, insulation materials unfortunately either will decompose at higher temperatures (120 to 200° C. depending on the polymer) and/or become brittle at low temperatures (-30 to -100° C. depending on the polymer). Some attempts have been made to support elastomeric or other sensitive polymer materials by equipping them with an inner structure or layer acting as spacer, such as in DE 9117159, in DE 4143670 and the very similar DE 4143646 and DD 247586 (all show corrugated structure), DE 2461013 (triangular structure), EP 1180635 (fibrous separator) etc., however, the materials used and the general construction will not allow to extend the use beyond +180° C. or -30° C. temperature limits, respectively. Especially high and low temperature insulation by using the same system is not feasible with the a.m. materials.

SUMMARY OF THE INVENTION

A major object of the present invention thus is to provide a system or material not showing the above mentioned deficiencies but exhibiting good high thermal resistance against typical application temperatures around and higher than 200° C. and low temperature flexibility of the insulation together at temperatures lower than -40° C. with low density and good flexibility.

Surprisingly, it is found that such system or material not showing the above mentioned disadvantages can be made as a composite comprising a structured inner decoupling layer, a thermally inert intermediate layer and an expanded polymeric layer.

BRIEF DESCRIPTION OF THE DRAWINGS

In the drawings, which form a part of this specification.

DETAILED DESCRIPTION

Figure 1:
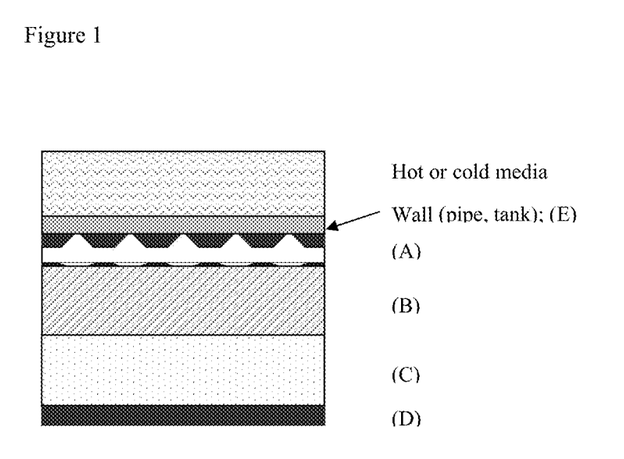
FIG. 1 is a schematic drawing of the claimed thermal and/or sound insulation material.
Figure 2:
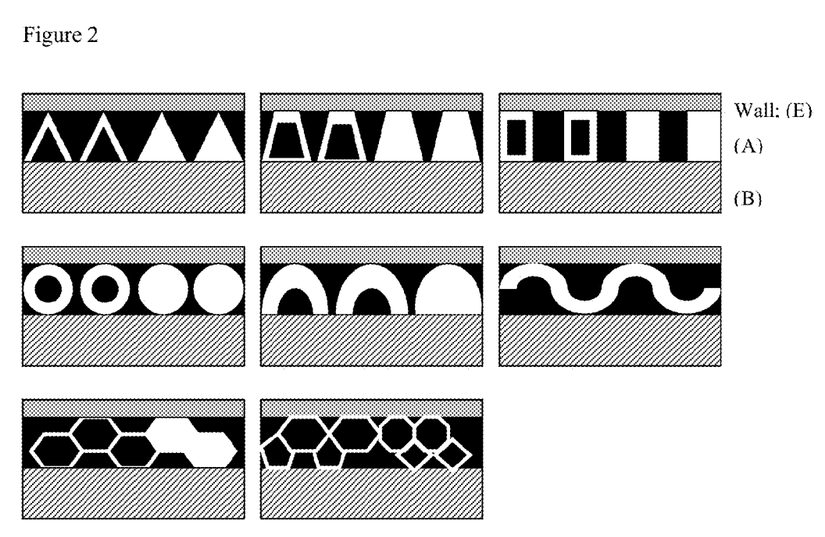
FIG. 2 is a schematic drawing of different embodiments of layer (A)
Figure 3:
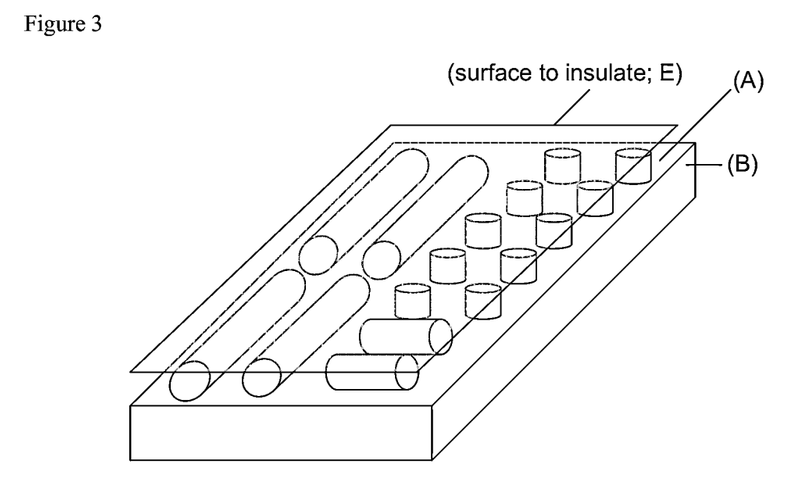
FIG. 3 is a schematic drawing of different structures with longitudinal or transversal orientations or orientations rectangular to those.

The claimed material comprises at least one layer (A), see FIG. 1, which is a thermal and/or acoustic decoupling layer. The decoupling effect is achieved by applying layer (A) as a layer with a two and/or three dimensional structure to minimise the contact surface between the hot or cold surface and the claimed material. The structure can be of any shape providing said surface minimisation, such as triangular, sinus shape, rectangular, trapezoidal, (semi)circular (semi)multi-edge (e.g. honeycomb) etc., see FIG. 2, and any combinations thereof, see FIGS. 3 and 4. The structure of any shape can be applied in two dimensional manner, as e.g. ridges or tubes, or in three dimensional manner, as e.g. knobs, and any combinations thereof; the structure can be applied longitudinally or transversally or in any combinations thereof (see FIG. 3). This can be achieved by extrusion, embossing, deep-drawing, moulding, by applying the structure directly or by applying it onto a carrier (layer), in cold, warm or hot state, or in any combination of applicable methods.

Layer (A) may comprise foil(s) and/or sheet(s) of paper, carton, fibre (hollow and massive), metal, polymers etc. and any combinations thereof. Preferred are layers (A) comprising high and low temperature resistant materials and fibres, as foil, sheet, mat, as woven or nonwoven and/or with or in a binder matrix and/or coated and/or impregnated and/or laminated. Especially preferred are materials of low abrasiveness and/or low corrosiveness, such as paper, carton, pulp/cellulose/cellulose acetate, polylactide, polyester, polyacryl, hemp, wool, sisal, flax, bamboo etc., but also treated and/or embedded glass, aramide or ceramic fibres, and any combinations thereof. The desired low abrasiveness/corrosiveness (as e.g. metal installations should not be influenced negatively by the insulation) can also be achieved by proper embedding even critical fibres into a matrix, e.g. of polymer, resin etc.

Figure 4:
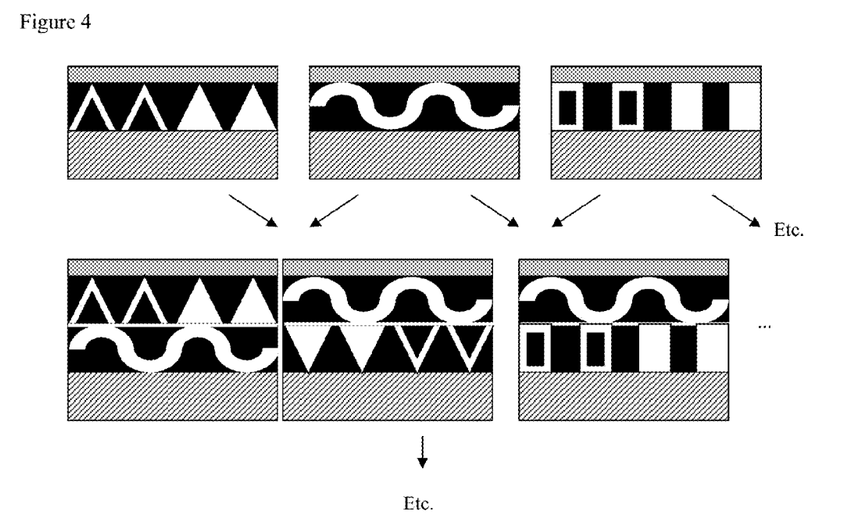
FIG. 4 is a schematic drawing of different combination of the structure in different layers.

Layer (A) can be of complex composition, see FIG. 4, e.g. it may comprise several structured layers staggered into each other, or it may show a carrier layer, or it may show structures to the outer side of the insulation system, too.

Layer (A) will lead to significant decoupling of the following layers from the hot or cold surface to insulate (see table 3 and 4). The depth of the structure is found to be optimal between 3 and 5 mm (see table 4), and the shape if found to be optimal when being triangular or sinus like (see table 3). Best combination of thermal and acoustic decoupling if found for sinus like structures.

Layer (A) may be very thin (e.g. 10 micron) up to several millimeters thickness, preferably less than 6 mm to ensure good flexibility, but preferably more than 0.3 mm to ensure sufficient strength.

Figure 5:
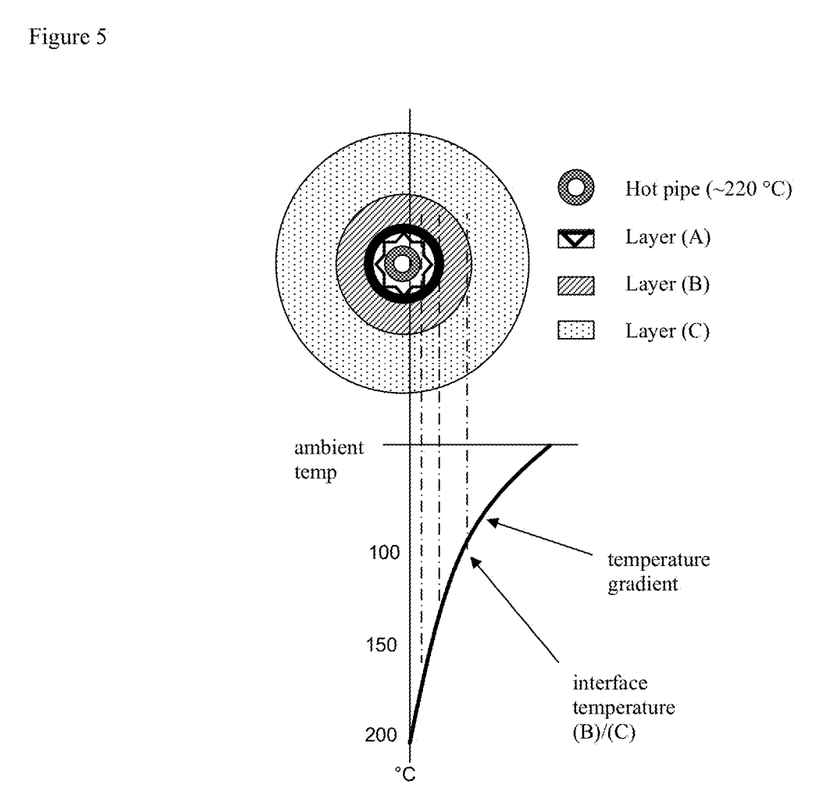
FIG. 5 is a cross-sectional schematic drawing of the claimed thermal and/or sound insulation material and the corresponding thermal gradient.

The claimed material comprises at least one layer (B), see FIG. 1 for obtaining a thermal gradient (see FIG. 5) comprising temperature invariant materials, such as massive or foamed glass, hollow or massive particles, e.g. spherical, of e.g. glass, metals, metal oxides/hydroxides, minerals (e.g. perlite, expanded and unexpanded), micro and nano scale inorganic particles in a matrix (e.g. Aerogel®), fibres of glass, mineral/ceramics (e.g. Fiberfrax®), carbon, amide, aramide, imide or polyester, organic fibres such as cellulose, wool, hemp sisal, etc.; as tissue, woven or nonwoven, as chopped fibre, short or long fibre, with or without binder, in a matrix; or any combination thereof.

Layer (B) may show surface structures itself for decoupling purposes, as described for layer (A). (B) may be connected to (A) and/or (C) by mechanical means, by chemical adhesion or by direct connection during manufacturing, e.g. by co-extruding, co-moulding and/or lamination. Care has to be taken that the connecting layer or interface is sufficiently heat resistant or low temperature flexible. Depending on the interface temperature adhesives such as one or two part silicone, polyurethane, acrylate, chloroprene, contact adhesives or hot melts or any combination thereof can be applied.

Layer (B) shows a maximum thermal conductivity of 0.1 W/mK, preferably less than 0.051 W/mK.

Layer (B) may show a thickness between 5 and 50 millimeters, depending on the thermal conductivity and the temperature gradient to be achieved.

The claimed material comprises at least one layer (C), see FIG. 1, comprising an expanded polymer blend. The expanded polymer blend may comprise elastomers (e.g. ACM/AEM, BR, BIIR, CIIR, CM/CR, CSM, EPM/EPDM, FKM/FPM, IIR, (V) MQ, (H)NBR, SBR etc.) and/or thermoplasts (e.g. polyolefins, polyamides, polyesters, polyethers etc.), thermoplastic elastomers, thermosets, and any mixtures thereof. Preferred are elastomers; especially preferred are elastomers with good temperature resistance, such as EPM/EPDM, HNBR, MQ etc.

The expanded polymer blend may comprise a crosslinking system, such as peroxides, hydrosilylation agents, radiation activators, sulphur compounds, bisphenolics, metal oxides etc.

The expanded polymer blend furthermore comprises at least one expansion agent chosen from the classes of chemical expansion agents (e.g. releasing carbon dioxide, nitrogen, oxygen or water) and/or physical expansion agents (e.g. solvents, CO2, N2, other gases).

The polymer blend is expanded to a mainly closed cell foam with a closed cell content of at least 80% and to a density of less than 150 kg/m3, preferably less than 75 kg/m3, to lower the thermal conductivity to less than 0.045 W/mK at 0° C.

The polymer blend furthermore may comprise one or more fillers chosen from the classes of metal and half metal oxides or hydroxides, carbon blacks, carbonates, and sulphates.

The polymer blend furthermore may comprise a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivates), complex silicates (e.g. perlite, vermiculite), and combinations thereof.

The polymer blend furthermore may comprise all kinds of other fillers or additives, such as other elastomers, thermoplastic elastomers and/or thermoplastics and/or thermoset based polymer mixtures, or combinations thereof, or as recycled material, other recycled polymer based materials, fibres etc. Preferred are fillers or additives supporting the heat resistance of the blend either by direct stabilization and/or by synergistic effects with the heat stabilizing system, such as carbon black, iron oxide, e.g. magnetite, vermiculite, perlite, etc., or mixtures thereof.

The polymer blend may comprise further additives such as flame retardants, biocides, plasticizers, stabilizers, colours etc., of any kind in any ratio, including additives for improving its manufacturing, application, aspect and performance properties, such as inhibitors, retarders, accelerators, etc.; and/or additives for adapting it to the applications' needs, such as char-forming and/or intumescent additives, like expanding graphite, to render the material self-intumescent in case of fire to close and protect e.g. wall and bulkhead penetrations; and/or substances that will lead to a self-ceramifying effect to pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

Layer (C) may show surface structures itself for decoupling purposes, as described for layer (A) and (B). (C) may be connected to (B) by mechanical means, by chemical adhesion or by direct connection during manufacturing, e.g. by co-extruding, co-moulding and/or lamination. Care has to be taken that the connecting layer or interface is sufficiently heat resistant or low temperature flexible. Depending on the interface temperature adhesives such as one or two part silicone, polyurethane, acrylate, chloroprene, contact adhesives or hot melts or any combination thereof can be applied.

The claimed material furthermore may comprise additional layers (D) providing additional insulation or diffusion barrier or protection properties, or a combination thereof. Layers (D) may be applied underneath or on top of layers (A)-(C) or within the layers (A)-(C). Layers (D) can preferably be applied on the outer surface of the system for protection purposes, e.g. against weathering, UV, or mechanical impact.

The claimed material furthermore may comprise additional parts (E), see FIG. 1, not being insulation material, e.g. plastics or metal work like pipes or tubes, such as corrugated metal pipe, that can be directly be co-extruded on by the system (A)-(C)/(D) or that can be inserted into the insulation part after its manufacturing, to form a pre-insulated system.

The claimed material furthermore may comprise a combination (F) of two or more pipes or tubes comprising at least (A), (C) and (E), preferably (A), (B), (C) and (E). The combination (F) can be embedded in a common matrix, such as another foam, or can be wrapped by a cladding, or the like, or can consist of at least two pre-insulated pipes that are connected permanently or that can be separated from each other, e.g. by connecting them temporarily with an appropriate adhesive. (F) can also comprise additional parts like wires, tubes, links etc., that are required by the intended application, such as control lines for solar pipe work or any kind of detectors.

It is a prominent advantage of the claimed material that it is providing reliable and sustainable thermal insulation and acoustic damping at temperatures raising up to 250° C. when being applied as a (A)/(B)/(C) system and at least up to 200° C. when applied as (A)/(C) system.

It is a another prominent advantage of the claimed material that it is providing reliable and sustainable thermal insulation and acoustic damping at temperatures down to −200° C. when being applied as a (A)/(B)/(C) system and at least down to −100° C. when applied as (A)/(C) system.

Another basic advantage of the claimed material is the fact that it is flexible and easy in mounting and demounting, even when it comes to insulation elbows, valves, flanges etc.

It is another important advantage of the claimed material that its insulation properties are very constant over a wide temperature range.

It is a further advantage of the claimed material that its composition will allow to use it indoors as well as outdoors, as weathering and UV stability is provided, as well as non toxic composition, and no odour being formed.

It is a resulting advantage of the claimed material that it is environmental friendly itself as it does not comprise or release harmful substances, does not affect water or soil and as it can be blended or filled with or can contain scrapped or recycled material of the same kind to a very high extent not losing relevant properties significantly. Fibres possibly being present in the claimed material are either bound in a matrix, e.g. for layer (A), or entrapped between impermeable layers, e.g. for layer (B), therefore, the claimed materials do not release fibres into the air.

A further advantage of the claimed material is that phthalates are not needed as plasticizers, nor PVC or other halogenated materials as ingredient which are partially under discussion and partially prohibited already for the same reason.

A further advantage of the claimed material is the possibility to adapt its properties to the desired property profile (concerning insulation, mechanical resistance etc.) by expanding it to an appropriate foam cell structure or density or by applying appropriate layer combinations.

It is a prominent advantage of the claimed material that it can be produced in an economic way in a one-step mixing and a one-step shaping process, e.g. by moulding, extrusion and other shaping methods. It shows versatility in possibilities of manufacturing and application. It can be extruded, co-extruded, laminated, moulded, co-moulded etc. as single item or multilayer and thus it can be applied in unrestricted shaping.

It is a further advantage of the claimed material that it can be transformed and given shape by standard methods being widespread in the industry and that it does not require specialized equipment.

A further advantage of the claimed material is the fact that it is easily colourable, e.g. in red or blue to indicate heat or cold.

It is a further prominent advantage of the claimed material that layer (A) is non corrosive and not abrasive and therefore the claimed material can be mounted even on critical substrates. Layer (A) is also responsible for allowing the whole composite to move e.g. on a pipe within certain limits bringing down the level of harshness in case of vibration or other mechanical impact. The structure of (A) will also stabilize the possibly fibrous or loosely layered materials for (B) and prevent shifting, compression or collapse.

Another prominent advantage of the claimed material is its built-in vapour barrier property provided by the mainly closed cell foam of (C) which will prevent condensation of humidity onto the installation to insulate. This is very important to exclude under insulation corrosion especially at low temperature applications.

A further advantage of the claimed material is that it can be used for applications requiring high temperature resistance and/or low temperature flexibility at application temperatures >180° C. or <−40° C., respectively, such as for thermal solar pipe and tank insulation, industrial thermal and/or acoustic insulation, e.g. for high and low temp (e.g. cryogenic) fluid pipe and tank insulation, for indoor and/or outdoor purposes.

It is a further advantage of the claimed material that it can be used for applications requiring sufficient viscous response at given application temperatures for noise/vibration/sound absorption and/or damping at temperatures >180° C. or <−40° C., respectively, such as noise absorption in cooling towers, pipelines, cryogenic fluid pipe etc.

Density was tested by ISO 845; LOI by ISO 4589; thermal conductivity by EN 12667; flammability classification (of whole system) in accordance with EN 13501/EN 13823.

EXAMPLES

For the following examples sheets of 19 mm thickness and 30 cm width and tubes of 19 mm thickness and various inner diameter had been produced by extruding, expanding and crosslinking a respective rubber compound (Armaprene® HT, EPDM based, Armacell GmbH, Germany) for layer (C); for thermoplast insulation for layer (C) respective material had been extruded and expanded by physical foaming (polyethylene; Tubolit®, Armacell sro, Poland). Table 1 shows some combinations of the respective materials to obtain multilayer composites.

TABLE 1

| | (A) | (B) | (C) |
|---|---|---|---|
| a: Combinations of materials for multilayer composites comprising elastomer (all innovative examples) | | | |
| COMPOSITE 1 | | | |
| Material | Impregnated paper | Glass wool, 20 mm | EPDM foam, 19 mm |
| Surface structure of inner surface | Corrugated (sinus shape), 5 mm | — | — |
| Surface structure of outer surface | — | — | — |
| COMPOSITE 2 | | | |
| Material | Impregnated paper | Glass wool, 20 mm | |
| Surface structure of inner surface | Corrugated (sinus shape), 5 mm | Sinus shape, 3 mm | — |
| Surface structure of outer surface | Trapezoidal, 5 mm | — | — |

TABLE 1-continued

|  | (A) | (B) | (C) |
|---|---|---|---|
| COMPOSITE 3 | | | |
| Material | Fibre-reinforced plastic | Ceramic fibre, 20 mm | EPDM foam, 19 mm |
| Surface structure of inner surface | Triangular (delta shape), 5 mm | — | — |
| Surface structure of outer surface | none | — | — |
| COMPOSITE 4 | | | |
| Material | Fibre-reinforced plastic | Ceramic fibre, 20 mm | EPDM foam, 19 mm |
| Surface structure of inner surface | Triangular (delta shape), 5 mm | Sinus shape, 3 mm | — |
| Surface structure of outer surface | Trapezoidal, 5 mm | — | — |
| b: Combinations of materials for multilayer composites comprising thermoplast (all innovative examples) | | | |
| COMPOSITE 5 | | | |
| Material | Impregnated paper | Glass wool, 20 mm | PE foam, 19 mm |
| Surface structure of inner surface | Corrugated (sinus shape), 5 mm | — | — |
| Surface structure of outer surface | — | — | — |
| COMPOSITE 6 | | | |
| Material | Impregnated paper | Glass wool, 20 mm | PE foam, 19 mm |
| Surface structure of inner surface | Corrugated (sinus shape), 5 mm | Sinus shape, 3 mm | — |
| Surface structure of outer surface | Trapezoidal, 5 mm | — | — |
| COMPOSITE 7 | | | |
| Material | Fibre-reinforced plastic | Ceramic fibre, 20 mm | PE foam, 19 mm |
| Surface structure of inner surface | Triangular (delta shape), 5 mm | — | — |
| Surface structure of outer surface | none | — | — |
| COMPOSITE 8 | | | |
| Material | Fibre-reinforced plastic | Ceramic fibre, 20 mm | PE foam, 19 mm |
| Surface structure of inner surface | Triangular (delta shape), 5 mm | Sinus shape, 3 mm | — |
| Surface structure of outer surface | Trapezoidal, 5 mm | — | — |

Raw materials used: impregnated paper (Technocell 250 g/m², impregnated with acrylic resin, Felix Schoeller GmbH, Germany); fibre-reinforced plastic (made from glass fibre mat 225 g/m² and epoxy resin type MP, both R&G Faserverbundwerkstoffe GmbH, Germany); glass wool (Isover®, Saint Gobain SA, France); ceramic fibre (Fiberfrax® Durablanket, Unifrax Corp., U.S.A.).

Example 1

Insulation Properties of Composite Systems

Density was tested by ISO 845; LOI by ISO 4589; thermal conductivity by EN 12667; flammability classification (of whole system) in accordance with EN 13501/EN 13823.

TABLE 2

Physical properties of innovative examples from table 1

| | COMPOSITE no. | | | | | | | |
|---|---|---|---|---|---|---|---|---|
| | 1 | 2 | 3 | 4 | 5 | 6 | 7 | 8 |
| Density [kg/m3] B/C | 45/60 | 45/60 | 45/60 | 45/60 | 95/30 | 95/30 | 95/30 | 95/30 |
| LOI of C | 32 | 32 | 32 | 32 | 24 | 24 | 24 | 24 |
| Thermal Conductivity at 0° C. [W/mK] B/C | 0.040/0.038 | 0.040/0.038 | 0.040/0.038 | 0.040/0.038 | 0.047/0.028 | 0.047/0.028 | 0.047/0.028 | 0.047/0.028 |
| Flammability Class | C S3 d0 | C S2 d0 | C S2 d0 | D S2 d0 | D S1 d1 | D S1 d1 | D S1 d1 | E |

Example 2

Cyclic Heat Aging

Composite tubes with a composition according to table 1 were manufactured by laminating layer (A) onto a blanket of (B) by help of CR glue (Armaflex® 520, Armacell GmbH, Germany) and then co-extruding or overmoulding it with (C), respectively. Respective tube material of 1 m length was mounted on a stainless steel pipe of 1" (2.54 cm) diameter. The pipe was heated up to 220° C. by thermal oil and left at that temperature for 18 h. After let cool down to ambient temperature the same cycle was applied. This was repeated 60 times in total. The material therefore was loaded for minimum 1000 hours with temperatures of minimum 200° C. The interface temperature between (B) and (C) was measured as explained for example 3. The test setup for the layers is similar to the one shown in FIG. 5.

TABLE 3

Properties after cyclic heat aging

|   | Interface temp. B/C [° C.] | Integrity of (C); observations | Cell structure | Change of Thermal Conductivity [%] |
|---|---|---|---|---|
| 1 | 145 | Hardening of inner 3-5 mm, total structure maintained | unchanged | +10 |
| 2 | 136 | Hardening of inner 2-3 mm, total structure maintained | unchanged | +10 |
| 3 | 134 | Hardening of inner 2-3 mm, total structure maintained | unchanged | +5 |
| 4 | 122 | Slight hardening of inner 2-3 mm, total structure maintained | unchanged | +3 |
| 5* | 139 | Melting of innermost 2 mm, rest of structure maintained | Innermost cell layer destroyed | +30 |
| 6* | 131 | Melting of innermost 2 mm, rest of structure maintained | Innermost cell layer destroyed | +25 |
| 7* | 128 | Melting of innermost 2 mm, rest of structure maintained | Innermost cell layer destroyed | +25 |
| 8* | 117 | Slight melting of innermost surface, total structure maintained | unchanged | +10 |

*For composites 5-8 a slight setting process was observed leading to shrinkage of 0.5 to 1.5 mm in diameter.

Example 3

Influence of Surface Structures on Temperature Shielding

Several combinations of surface structures for (A) were tested in different depth, keeping the width of the structure at approximately 5 mm. The material for (A) was impregnated paper where structures had been embossed mechanically by a positive/negative punch. For determining the influence of the structure on thermal shielding the respective layer (A) was cut to 300×200 mm sheet and placed on a 220° C. Mettler lab heating plate. 20 mm of glass wool blanket of the same size was used for (B), and elastomeric foam of 66 kg/m3 density (HT/Armaflex®, Armacell, Germany) of the same size was used for (C). A metal plate of 500 g weight was placed on top of (C) to prevent air entrapment between the layers. Five thermocouples were mounted in an X-pattern between (B) and (C); the average interface temperature (see also FIG. 5) in table 4 is the average of the five thermocouple values.

TABLE 4

Interface temperature in ° C. by surface structure
(I = inner side, O = outer side)

| | I: Triangular O: — | I: Triangular O: Triangular | I: Triangular O: Trapezoid | I: Trapezoid O: Trapezoid | I: Trapezoid O: — |
|---|---|---|---|---|---|
| I: 3 mm O: — | 140 | — | — | — | 143 |
| I: 3 mm O: 3 mm | — | 123 | 125 | 129 | — |
| I: 5 mm O: — | 134 | — | — | — | 136 |
| I: 5 mm O: 5 mm | — | 119 | 122 | 124 | — |
| I: 7 mm O: — | 136 | — | — | — | 140 |
| I: 7 mm O: 7 mm | — | 125 | 126 | 131 | — |
| I: 9 mm O: — | 136 | — | — | — | 142 |
| I: 9 mm O: 9 mm | — | 125 | 125 | 128 | — |

We claim:

1. A material comprising at least one of a thermal or sound insulation material comprising at least one inner layer (A) comprising at least one of temperature invariant or temperature resistant material as decoupling layer showing a two or three dimensionally structured surface on at least one side, at least one layer (B) as intermediate temperature gradient layer comprising at least one of temperature invariant or temperature resistant material, and at least one outer layer (C) as insulation layer comprising an expanded polymer blend wherein layer (A) has a thickness >10 micron, layer (B) has a maximum thermal conductivity of 0.1 W/mK, and a thickness between 5 and 50 millimeters, and the polymer blend of layer (C) is expanded to a closed cell content of at least 80%.

2. The material according to claim 1 wherein the polymer blend of layer (C) is expanded to a density of less than 150 kg/m$^3$, according to ISO 845.

3. The material according to claim 1 wherein the expanded polymer blend has a thermal conductivity of less than 0.10 W/mK at 0° C., according to EN 12667.

4. The material according to claim 1 wherein the polymer blend is crosslinked.

5. The material according to claim 1 wherein the polymer content of the polymer blend is elastomeric.

6. The material according to claim 1 wherein the polymer blend comprises at least one of a heat or reversion stabilizing system.

7. The material according to claim 1 wherein the structures of layer (A) show at least one of triangular, sinus like, trapezoidal, rectangular, (semi)circular or (semi)multi-edge cross-section.

8. The material according to claim 1 wherein surface structures are on both sides of layer (A).

9. The material according to claim 1 wherein surface structures are on any side of any of the layers (A), (B), (C).

10. The material according to claim 7 wherein the structures of layer (A) are ridge structures.

11. The material according to claim 1 which comprises additional layers for protection, barrier and shielding purposes at least one of on, under or within other layers.

12. The material according to claim 1 wherein pipes or tubes of plastics and metal are covered by the insulation layers to form pre-insulated parts.

13. A process for manufacturing the material according to claim 1 in at least one of a moulding, continuous (co)extrusion or lamination process followed by or comprising a process for generating surface structures.

14. A process for manufacturing the material according to claim 12 in a continuous process.

15. The use of a material according to claim 1 for applications requiring at least one of high temperature resistance or low temperature flexibility at application temperatures >180° C. or <−40° C., respectively.

16. The use of a material according to claim 1 and for applications requiring sufficient viscous response at given application temperatures for at least one of noise/vibration/sound absorption or damping at temperatures >180° C. or <−40° C., respectively.

17. The material of claim 1 wherein layer (B) has a maximum thermal conductivity of less than 0.051 W/mK.

18. The material of claim 2 wherein the polymer blend layer is expanded to a density of less than 75 kg/m$^3$ according to ISO 845.

19. The material of claim 3 wherein the expanded polymer blend has a thermal conductivity of less than 0.045 W/mK at 0° C. according to EN 12667.

20. The material of claim 1, wherein layer (A) has a thickness between 0.1 and 6 mm.

* * * * *